United States Patent
Rivaud et al.

(10) Patent No.: US 8,630,315 B2
(45) Date of Patent: Jan. 14, 2014

(54) ETHERNET NETWORK SYNCHRONIZATION SYSTEMS AND METHODS

(75) Inventors: Daniel Rivaud, Ottawa (CA); Michaël Gazier, Ottawa (CA); Michael Dziawa, Richmond (CA)

(73) Assignee: Ciena Corporation, Hanover, MD (US)

(*) Notice: Subject to any disclaimer, the term of this patent is extended or adjusted under 35 U.S.C. 154(b) by 496 days.

(21) Appl. No.: 12/706,724

(22) Filed: Feb. 17, 2010

(65) Prior Publication Data

US 2011/0200051 A1 Aug. 18, 2011

(51) Int. Cl.
*H04J 3/06* (2006.01)

(52) U.S. Cl.
USPC .......................................... 370/509; 370/522

(58) Field of Classification Search
None
See application file for complete search history.

(56) References Cited

U.S. PATENT DOCUMENTS

| | | | | |
|---|---|---|---|---|
| 7,372,875 B2 * | 5/2008 | Hadzic et al. | | 370/516 |
| 7,693,130 B2 * | 4/2010 | Barry et al. | | 370/350 |
| 7,742,505 B2 * | 6/2010 | Venters et al. | | 370/503 |
| 2005/0041691 A1 * | 2/2005 | Laufer et al. | | 370/503 |
| 2007/0223484 A1 * | 9/2007 | Crowle et al. | | 370/394 |
| 2009/0059799 A1 * | 3/2009 | Friskney et al. | | 370/241.1 |
| 2009/0147806 A1 * | 6/2009 | Brueckheimer | | 370/503 |
| 2010/0020829 A1 * | 1/2010 | Ruffini | | 370/509 |
| 2010/0085989 A1 * | 4/2010 | Belhadj et al. | | 370/503 |
| 2010/0118894 A1 * | 5/2010 | Aweya et al. | | 370/503 |
| 2011/0142080 A1 * | 6/2011 | Diab | | 370/503 |
| 2011/0255546 A1 * | 10/2011 | Le Pallec et al. | | 370/400 |

* cited by examiner

*Primary Examiner* — Michael J Moore, Jr.
(74) *Attorney, Agent, or Firm* — Clements Bernard PLLC; Christopher L. Bernard; Lawrence A. Baratta, Jr.

(57) ABSTRACT

The present disclosure relates to Ethernet synchronization systems and methods that combines Synchronous Ethernet (Sync-E) and Precision Time Protocol (PTP) IEEE 1588 algorithms. The present invention includes systems and methods for Ethernet networks and node configurations that include a set of rules on node placement, such as Boundary Clock (BC) nodes and Sync-E nodes, a clock selection algorithm, a holdover algorithm, and the like. Advantageously, the present invention provides an architecture that allows practical and real-world useful clock propagation through placement of BCs and Sync-E nodes for best performance. Practical experience and theoretical design are embodied in the present invention to define a very specific set of rules on how to build a network capable of providing accurate and reliable synchronization. The present invention includes clock selection that unifies Sync-E and 1588 algorithms.

19 Claims, 13 Drawing Sheets

| APPLICATION | SYNCHRONIZATION REQUIREMENT |
|---|---|
| Voice | < 32 ppm |
| Ethernet Best Effort | < 100 ppm |
| Two-Way Video | < 50 ppb |
| One-way Video MPEG | < 500 ppb |
| One-Way Video HDTV | < 100 ppb |
| One-Way Video IPTC | < 100 ppb |
| LTE | +- 1.25 usec absolute phase etc |

*FIG. 3*

ETHERNET NETWORK SYNCHRONIZATION SYSTEMS AND METHODS

FIELD OF THE INVENTION

The present invention relates generally to Ethernet networks. More particularly, the present invention relates to Ethernet network synchronization systems and methods utilizing Synchronous Ethernet (referred to herein as "Sync-E") and various IEEE 1588 Precision Time Protocol (PTP) standards in a combined fashion along with a set of rules on node placement, such as Boundary Clock (BC) nodes and Sync-E nodes, a clock selection algorithm, a holdover algorithm, and the like.

BACKGROUND OF THE INVENTION

Conventionally, networks are deployed in tiered architectures utilizing a variety of transport media, e.g. optical fiber, wireless, coaxial cable, twisted pair, etc., and layers. Further, access, aggregation, long-haul, and other network types may use a variety of protocols, such as SONET, SDH, Optical Transport Network (OTN), and the like, as the underlying physical protocol. OTN is generally defined in various ITU-T recommendations, such as ITU-T Recommendation G.709 "Interfaces for the optical transport network (OTN)." OTN is capable of carrying synchronous, plesiochronous, or otherwise timed or untimed signals, but OTN does not carry any timing or synchronization in itself (i.e., OTN is asynchronous). Most networks are evolving to use Ethernet as a dominant transmission protocol, such as Gigabit Ethernet (GE), 10-Gigabit Ethernet (10GE), 100-Gigabit Ethernet (100GE), and other Ethernet variants. Ethernet is inherently asynchronous. More modern versions of Ethernet can be synchronous (Synchronous Ethernet referred to herein as "Sync-E"), at the physical level (i.e., G.826x series of standards such as g.8261, g.8264). However, building a useful network based on Sync-E requires all nodes along a chain to meet the Sync-E specifications. For example if a single node is not Sync-E compliant then Sync-E will not traverse that node and thus will not be available to further nodes. This is problematic as most currently deployed Ethernet devices (e.g., switches) do not support Sync-E nor do most new devices. For example, many network operators are looking to upgrade parts of their networks to the new technology but not the entire network.

Alternatively IEEE 1588 can be used to distribute timing. As described herein, IEEE 1588 or just "1588" is used to refer to IEEE 1588-2002, 1588v2-2008 Precision Time Protocol (PTP) standards and any variations thereof. PTP operates on the principle of timestamps applied to packets that are sent from a timing source (reference master) to a timing slave. Timestamps are applied in order to allow a slave to synchronize to a source. A receiver slave thus can recreate the original clock by reading these timestamps and adapting its own clock to them. (i.e., typical the source clock is stratum compliant and Building Integrated Timing Supply (BITS) referenced). Timing means both frequency and phase/Time of Day (ToD). However, switches in a network (between the source and slave) add timing jitter and delay due to traffic loading variations. Thus, timestamp corrections are added to a PTP packet, by the switches and by other network elements, as the PTP packet traverses the network in order to eliminate jitter introduced due to residence times in switch nodes. Note, the residence time of a packet in a switch node is not known ahead of time as it depends on a variety of factors, such as packet priority, switch load, egress port load, etc. As such, PTP requires specialized hardware support to timestamp packets entering and leaving the switch nodes. Thus, all nodes must include such support for PTP, but most conventional networks do not have PTP-capable nodes requiring a newly built network to support PTP. Operating PTP at some nodes and not others will result in clocking issues such as inability to reach the required stratum or other clocking requirements at the end node, long convergence times, and additional costs of the end node equipment (high stability local oscillator). Packet based syntonization (frequency only) requirements are detailed in the following standards: G.8261, G.8262, G.8263, G.8264. Synchronization requirements (phase and frequency with phase accuracy up to 1 usec) are included in;G.pactiming-bis, G.8265 (under study), TS 25.402, TS 36.300, TS 36.401, etc.

Equivalently to 1588 PTP, Network Time Protocol (NTP) (such as NTPv4 or other variants) may be used. NTP however is designed to work as a series of hierarchical nodes and is normally not expected to be as precise as PTP (for example it might be required to be precise to 100 milliseconds (ms) resolution or less such as 1 msec, instead of a few microseconds), and usually NTP is almost always implemented in software instead of hardware and is usually less precise than either Sync-E or PTP. A variety of applications are run over Ethernet such as voice, two-way video, and the like that have absolute time requirements in addition to jitter and wander specifications (exemplary specifications and requirements include G.823/G.824 and G.8261/G.8264, Bellcore GR-1244 etc). Thus, there exists a need for improved Ethernet synchronization systems and methods that overcome the above listed deficiencies.

BRIEF SUMMARY OF THE INVENTION

In an exemplary embodiment, an Ethernet network includes one or more non-clocked nodes without synchronous Ethernet (Sync-E) or IEEE 1588 capability; an end node with a clock providing an Ethernet connection including a reference clock through at least one of the one or more non-clocked nodes; and a clock regeneration node disposed after the at least of one of the one or more non-clocked nodes receiving the Ethernet connection and regenerating the reference clock. The clock regeneration node may be located at a drop off point of the Ethernet connection. The clock regeneration node is configured to operate according to both synchronous Ethernet (Sync-E) and IEEE 1588 protocols. The Ethernet network further includes one or more Sync-E nodes receiving the Ethernet connection after the clock regeneration node, wherein the end node operates according to the IEEE 1588 protocols, and wherein the one or more Sync-E nodes operate according to the Sync-E protocols thereby reducing a number of slaves for IEEE 15888. The clock regeneration node may be configured to regenerate Sync-E for downstream nodes without requiring Sync-E upstream, and wherein the reference clock is according to the IEEE 1588 protocols and operable to transverse asynchronous nodes while being rebuilt at the clock regeneration node. Optionally, the Ethernet connection traverses no more than five consecutive non-clocked nodes prior to the clock regeneration node. Alternatively, the Ethernet connection traverses no more than one consecutive non-clocked node prior to the clock regeneration node. Also, the Ethernet connection may traverse more than one consecutive non-clocked node prior to the clock regeneration node, and the Ethernet network further includes a high stability local oscillator (oven controlled crystal or atomic) at the clock regeneration node. At each of the one or more non-clocked nodes is configured to provide packets from the Ethernet connection with the clock reference in a high priority queue. The end node may include physical interfaces and circuitry configured to timestamp ingress and egress packets relative to a local clock; a processor operating according to the IEEE 1588 protocols, the processor receiving timestamps and providing one or more reference clocks to an input selector; and a phase lock loop receiving an output of the input selector and providing an output reference clock to the processor. The Ethernet network further includes a best multi source clock selection algorithm and a clock selection holdover algorithm for the end node. The one or more Sync-E nodes each include physical interfaces providing a reference clock to a clock input selector; circuitry receiving synchronization status messages from the physical interfaces and providing the synchronization status messages to the clock input selector; and a phase lock loop receiving an input from the clock input selector and providing an output to the physical interfaces. The Ethernet network further includes a best multi source clock selection algorithm and a clock selection holdover algorithm for the end clock node.

In another exemplary embodiment, an Ethernet node includes physical interfaces and circuitry configured to timestamp ingress and egress packets relative to a local clock; a processor operating according to the IEEE 1588 protocols, the processor receiving timestamps and providing one or more reference clocks to an input selector; and a phase lock loop receiving an output of the input selector and providing an output reference clock to the processor; wherein the Ethernet node is configured as one of a Boundary Clock node, a Transparent Clock node, or an Ordinary Clock node. The Boundary Clock node is configured to receive a reference clock in an Ethernet connection previously traversing asynchronous nodes and to regenerate the reference clock. The Ethernet node is configured as a Boundary Clock node receiving the Ethernet connection from one or more previous asynchronous nodes. The Ethernet node further includes an external reference clock input to the input selector; a best multi source clock selection algorithm and; a clock selection holdover algorithm.

In another exemplary embodiment, a method includes transmitting an Ethernet connection with a reference clock in a network; adapting quality of service in at least one Transparent Clock node in the network for the Ethernet connection; and regenerating the reference clock after the Ethernet connection transverses at least one non-clocked node in the network. The method further includes receiving a plurality of reference sources at a node in the network, the reference sources including one or more of IEEE 1588 sources, Synchronous Ethernet (Sync-E) sources, SONET/SDH sources, Network Time Protocol sources, and external reference sources; determining quality metrics of the plurality of reference sources; selecting one of the plurality of reference sources based on the quality metrics; performing an adaptive/predictive filter algorithm; and inputting the selected source to a phase lock loop. The method further includes selecting one of the plurality of reference sources based on a tunnel technology including at least PBB-TE or MPLS-TP.

BRIEF DESCRIPTION OF THE DRAWINGS

The present invention is illustrated and described herein with reference to the various drawings of exemplary embodiments, in which like reference numbers denote like method steps and/or system components, respectively, and in which:

FIG. 3 is a table of various exemplary applications over Ethernet and associated synchronization requirements;

DETAILED DESCRIPTION OF THE INVENTION

In various exemplary embodiments, the present invention relates to Ethernet synchronization systems and methods that combine Sync-E and PTP 1588 algorithms. The present invention includes systems and methods for Ethernet networks and node configurations that include a set of rules on node placement, such as Boundary Clock (BC) nodes and Sync-E nodes, a clock selection algorithm, a holdover algorithm, and the like. Advantageously, the present invention provides an architecture that allows practical and real-world useful clock propagation through placement of BCs and Sync-E nodes for best performance. Each of the Sync-E and PTP 1588 Standards define a theoretical general set of tools and guidelines with gaps in functionality and application specific details. Practical experience and theoretical design are embodied in the present invention to define a very specific set of rules on how to build a practical, reliable, and accurate packet based synchronization network. The present invention includes clock selection that unifies Sync-E and 1588 algorithms. By allowing the clock selection algorithm to choose from a larger variety of sources, it is possible to select a better clock than an algorithm that only chooses from a single type of source. Additionally, the present invention may include modification of the algorithm by linking it to Provider Backbone Transport (PBT), Provider Backbone Bridge Traffic Engineering (PBB-TE) protection switching; automatically link timing path to provisioned PBT path, including Sync-E SSM-over-CFM. The present invention provides a closer coupling of CE with 1588.

Figure 1:
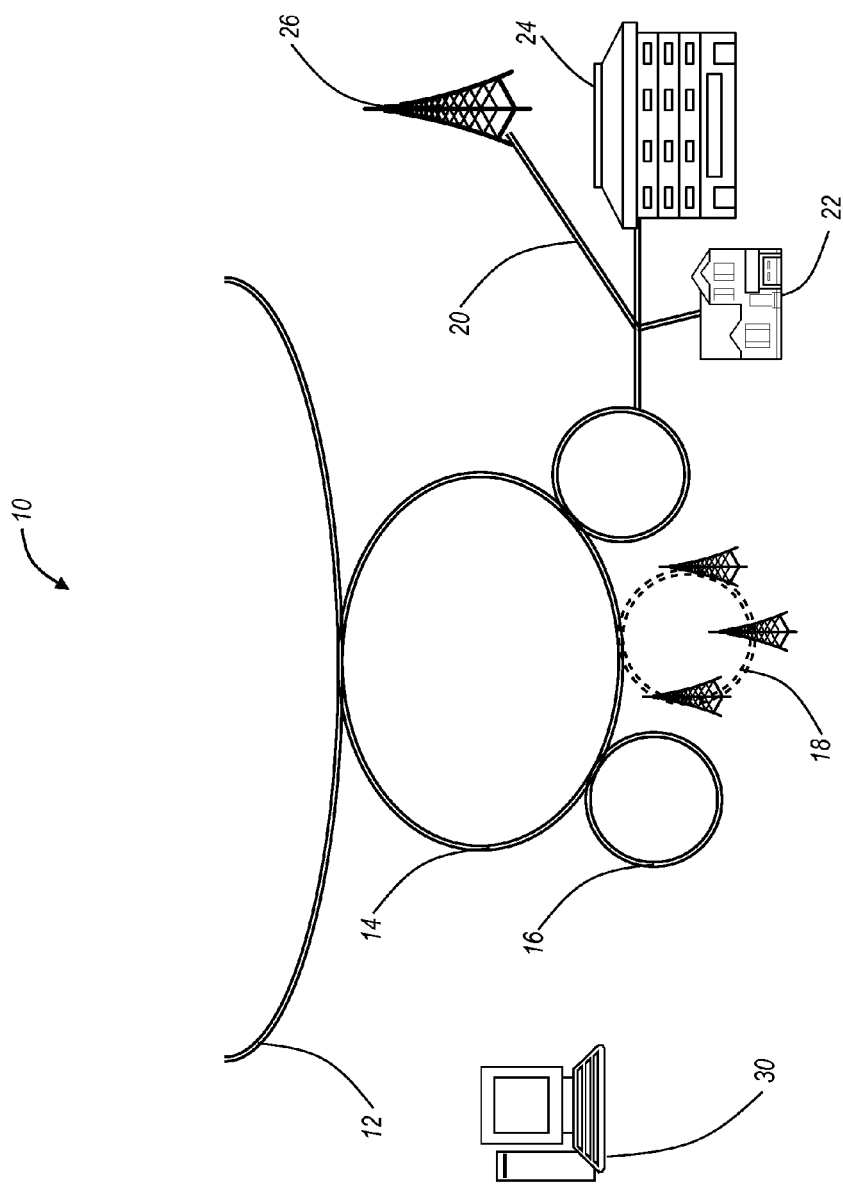
FIG. 1 is a diagram of a reference network architecture.

Referring to FIG. 1, in an exemplary embodiment, a reference network architecture 10 is illustrated. As described herein, the network architecture 10 includes multi-tiers, such as a core network 12, a metro core network 14, a secondary metro network 16, a radio sub-network 18, and an access network 20. The core network 12 generally provides long-haul and/or regional transport at high capacities. For example, the core network 12 may include dense wave division multiplexing (DWDM) systems with SONET/SDH and/or OTN protocols operating at 10 Gb/s, 40 Gb/s, and/or 100 Gb/s. The metro core network 14 provides regional access at high-to-medium capacities. The metro core network 14 may include DWDM, coarse WDM (CWDM), and the like with SONET/SDH, OTN, and/or direct over wavelength transport (e.g., Ethernet over WDM, Fibre Channel over WDM, and the like). The secondary metro network 16 may provide local access loops, such as digital loop carriers, coax cable, switches, routers, xPON networks, and the like. The network architecture 10 may further include a wireless network 18 (e.g., IEEE 802.11, 802.16, GSM, TDM, UMTS, LTE, etc.) and an access network 20 with a plurality of access nodes, such as a residence 22, a business 24, and a radio tower 26. Other access node types are also contemplated as are known in the art. The reference network architecture 10 also includes a network management system (NMS) 30. The NMS 30 is coupled to each of the networks 12, 14, 16, 18, 20 through various means, such as a data communications network. Also, the NMS 30 may include multiple systems (e.g., element management systems (EMSs)) with each system handling a specific network 12, 14, 16, 18, 20, for example. Generally, the NMS 30 provides operations, administration, maintenance, and provisioning (OAM&P) functionality for the various networks 12, 14, 16, 18, 20.

Figure 2D:
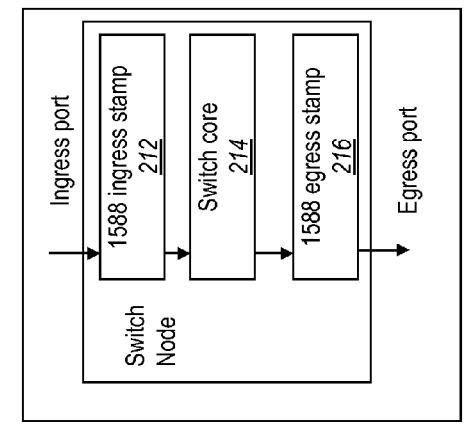
FIGS. 2a-2d are diagrams of various synchronous Ethernet networks and a Transparent Clock (TC) node.
Figure 2C:
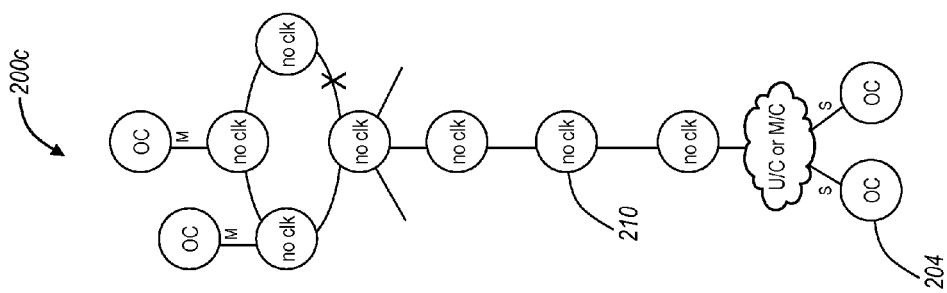
Figure 2B:
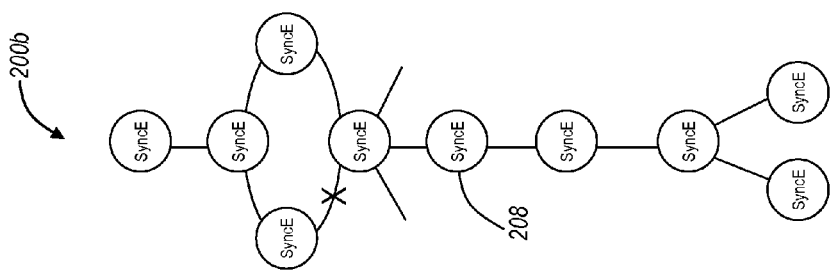
Figure 2A:
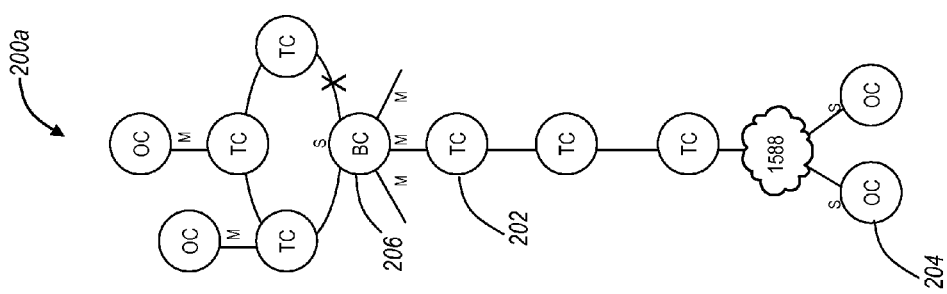

Referring to FIGS. 2a-2d, in exemplary embodiments, various Ethernet networks 200a, 200b, 200c and a Transparent Clock (TC) node 202 are illustrated. The Ethernet network 200a in FIG. 2a is a per-hop PTP 1588 network with Transparent Clocks at each node 202 such that Ordinary Clock (OC) Slave nodes 204 only have to filter timing jitter and wander accumulated from PHY's at every hop and a Boundary Clock (BC) node 206 that distributes the clock. The network 200a is an example of a full PTP network where each node 202, 204 has PTP capability. FIGS. 2a and 2c include labels "M" for master and "S" for slave to indicate nodal clock relationships. The Ethernet network 200b in FIG. 2b is a Sync-E network where each and every node 206 is able to recover timing from its Ethernet physical interface and condition the recovered clock with a local phase locked loop (Sync-E compliant) before passing the conditioned clock to the next node in the network. The Ethernet network 200c in FIG. 2c includes 1588 support at nodes 204 only at endpoints with no clock support at intervening nodes 210. Here, 1588 is used for messaging aspects only. The Ethernet network 200c will have synchronization issues such as difficulty or inability to reach stratum accuracy and stability requirements or other clocking requirements at the end nodes 204, long convergence times, and additional costs of the end node equipment (higher stability local oscillators and phase locked loop circuits). In this case the receiver has a "random" although (normally) bounded jitter and latency. This creates the need for a high order receiver clock and will at the very least mean a long time to tune in to the source (master), at the worse case the receiver (slave) may never tune in (to within required tolerance in the required time, as defined by g.8261, GR-1244, or other relevant specs). Tracking issues may also result from cascading wander filtering PLLs (Stratum 3E and higher), and the narrow loop bandwidth of these PLLs severely limits their tracking ability. FIG. 2d is a block diagram of associated functionality in the TC node 202. Specifically, the node 202 is modeled as a switch with an ingress port and an egress port. From the ingress port, the node 202 provides a 1588 ingress stamp 212, performs core switching functions 214, and provides a 1588 egress stamp 216. This is because the residence time of a packet in the node 202 is not known ahead of time as it depends on a variety of factors, such as packet priority, switch load, egress port load, etc. As such, PTP requires specialized hardware support to timestamp packets entering and leaving the switch nodes. This corrects for packet residence time in the switches. PTP nodes with this capability are referred to as Transparent Clock nodes (TC).

Referring to FIG. 3, a table illustrates various exemplary applications over Ethernet and associated synchronization requirements. Also, Y.1731 one or two way delay measurement resolution & accuracy must be under 250 usec to be meaningful for Time Division Multiplexed (TDM) transport over Ethernet since total budget for TDMoE (TDM over Ethernet) is generally around 2-8 msec.

Figure 4:
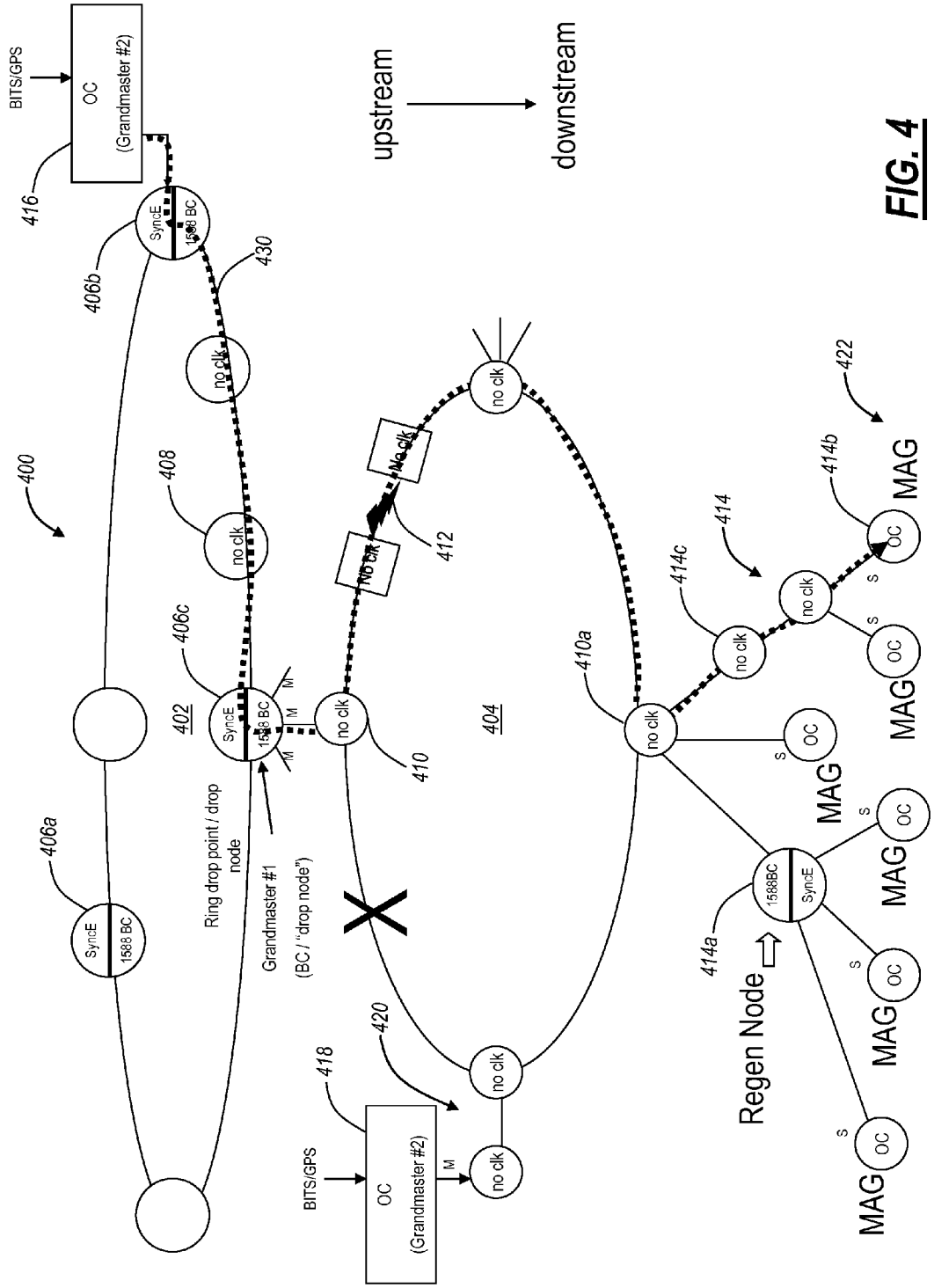
FIG. 4 is a diagram of a network with two rings illustrating the present invention for building an Ethernet network capable of distributing clocks.

Referring to FIG. 4, in an exemplary embodiment, a network 400 includes two rings 402, 404 illustrating the present invention for building an Ethernet network capable of distributing clocks. The present invention includes a method of building and operating a network capable of distributing clocks cost effectively with good network performance while avoiding the requirement to include Sync-E or 1588 functionality at every node. As mentioned, typical networks are built with a core ring and with adjacent rings or branches, and most of these networks do not have clock distribution capabilities when based on Ethernet. The network 400 includes a core ring 402 including Sync-E/PTP 1588 capable nodes 406a-406c and other nodes 408 with no clock capability. Note, as described herein, the nodes 408 with no clock capability means these nodes do not support Sync-E or PTP 1588. These nodes 408 may include a free-run clock capability. An adjacent ring 404 connects to the node 406c of the core ring 402, and the adjacent ring 404 includes various nodes 410 without clock capability including a microwave radio link 412 (which may be asynchronous or synchronous). Further, various nodes 414 branch off of the adjacent ring 404 at a node 410a. The nodes 414a include a Sync-E/PTP 1588 capable node 414a, OC nodes 414b, and nodes 414c with no clock capability. Additionally, the ring 402 may include an OC node 416 connected to the node 406b with the OC node 416 receiving a BITS or Global Positioning Satellite (GPS) timing reference. The ring 404 may include an OC node 418 connected to a branch 420 in the ring 404 with the OC node 418 receiving a BITS or Global Positioning Satellite (GPS) timing reference. For example, the OC node 418 may include a multi service access system (MSAS). As described herein, a MSAS is a head end of a network carrying Plesiochronous Digital Hierarchy (PDH) over Ethernet.

The present invention utilizes a clock regeneration node (also known as a boundary clock BC) at a ring drop off point, e.g. nodes 406a, 406b, 406c. Specifically, the nodes 406a, 406b, 406c include clock hardware and are configured to manage the PTP 1588 protocol. Depending on the number of Multi Access Gateways (MAGs) 422, a PTP 1588 master may have dozens to hundreds of slaves (and their associated state) to manage. For that reason, it may be a separate box dedicated to the PTP 1588 function at the nodes 406a, 406b, 406c. The present invention may resolve this scalability issue by using Sync-E in the last few hops in order to reduce the total number of PTP 1588 slaves, i.e. since normal structures are trees, reducing even the last hop to Sync-E means many less slaves, and trimming two aggregation levels can remove up to 95% of the slaves. This is done by using Sync-E in the last hops, the Sync-E being regenerated from PTP at the regeneration node 414a. The present invention may further include optimized or adaptive filter algorithms that can 'predict' or be informed of periods when the source clock may become unreliable or degraded to minimize transient issues. This allows (1) next hops on the same ring to use the regenerated clock, and allows (2) the downstream nodes (shown as the ring 404 or the branches 420 hanging off the ring 404) to have access to the main (now clean) clock. In a sense this is similar to a SONET/SDH network, however it has the important distinction that not every hop supports (a) synchronous clocks (Sync-E for Ethernet) or (b) any clocking or PTP 1588 at all.

The present invention utilizes a BC at the drop node 414a to regenerate Sync-E for downstream nodes even if there is no Sync-E upstream. Specifically, the OC node 416 provides an Ethernet connection 430 to the node 406b, through non-clocked nodes 408, dropping off the ring 402 at the node 406c. PTP 1588v2 is able to traverse asynchronous domains and rebuild a synchronous environment. This ability to regenerate Sync-E at specific points in the network (specifically including the drop point from the ring, but able to be anywhere) allows the network 400 to be built without each node including clock capabilities. The present invention includes the SyncE/1588 I/F in the "drop node" (i.e., the node 406c) so as not to add BC cost to the more numerous ring 402 nodes 408. The impact of BC functionality on the "drop node" is not high given that the hardware would already exist for Sync-E. Also, no 'phase' information is provided by Sync-E, but some wireless cell towers may require phase information, and as such, in that case, the ring 402 should run 1588. The network 400 includes the microwave link and other Ethernet (e.g., fiber) links both as examples of potential asynchronous (non-clocked) hops. Another examples of an asynchronous hops contemplated by the present invention include OTN (Optical Transport Network) links which themselves may contain embedded synchronous content such as SONET/SDH. Also, note that there are some non-BC nodes, i.e. nodes 408, on the core ring 402. In an exemplary embodiment, the present invention supports up to a maximum of five hops or links without a BC node for optimal cost, performance, and practicality of upgrading an existing network; however the number may be less or more than five (practical aspects likely limit the value to twelve as an absolute max in order to be able to meet relevant clocking requirements).

Each of the nodes 406a-c, 414a is illustrated in FIG. 4 as two half circles meaning that each of these nodes 406a-c, 414a is configured to allow translation between two protocol domains, i.e., the Sync-E domain and the PTP 1588 domain. As such, a node could use a Sync-E-derived clock as a reference for a 1588 clock. The two clocks would then be synchronized. For example, the ring 402 may use PTP 1588 whereas the ring 404 may only use Sync-E. A node with the two half circles ensures that the timing on the ring 404 is synchronized to the ring 402 even though each ring 402, 404 uses different protocols. For example, the rings 402, 400 include nodes 408 labeled as "no clock", but each of these nodes 408 may be part of an uninterrupted chain of Sync-E nodes; the Sync-E would be used to convey frequency to the endpoint and 1588 would use the Sync-E clock differentially and convey phase to the endpoint. Note that Sync-E can work without 1588, and 1588 can work without Sync-E. In an exemplary embodiment, the present invention recognizes that network operators ideally want both. If you have both, then the 1588 can use the Sync-E as a common reference and operate in differential mode (i.e., source and destination clocks use the common Sync-E to measure their difference/error against). Note also that those circles in the nodes 406a-c, 414a show BC and the BC does regeneration cleaning up the clock (e.g., since two hops are skipped without 1588 in the ring 402).

By definition, a 1588 BC simply has multiple 1588 ports in a single timing domain, and associated ports can be either master (M) or slave (S). The PTP 1588 standard does not specify whether the clock signal is cleaned up or not. Clock regeneration would normally be the case when a BC has a single slave port (receives timing) and one or more master ports (transmits timing), but this decision is left to the implementer. In the present invention, each BC does regenerate the clock. Note, TCs appear to have two 1588 ports, but each of those ports don't participate in the full 1588 protocol, so the node is not considered a BC. The main advantage of using BC nodes is that they allow the network 400 to scale larger than would be possible without BC nodes. It can be seen that the processing demands on the Grandmaster are proportional to the number of slaves being served, and that with thousands of slave clocks, the processing demands on the Grandmaster would be excessive. Putting BC's along the path between grandmaster and slaves allows the grandmaster to only process messages from the BC's; in turn the BC's take on the responsibility of processing messages from the slaves underneath them.

Figure 5:
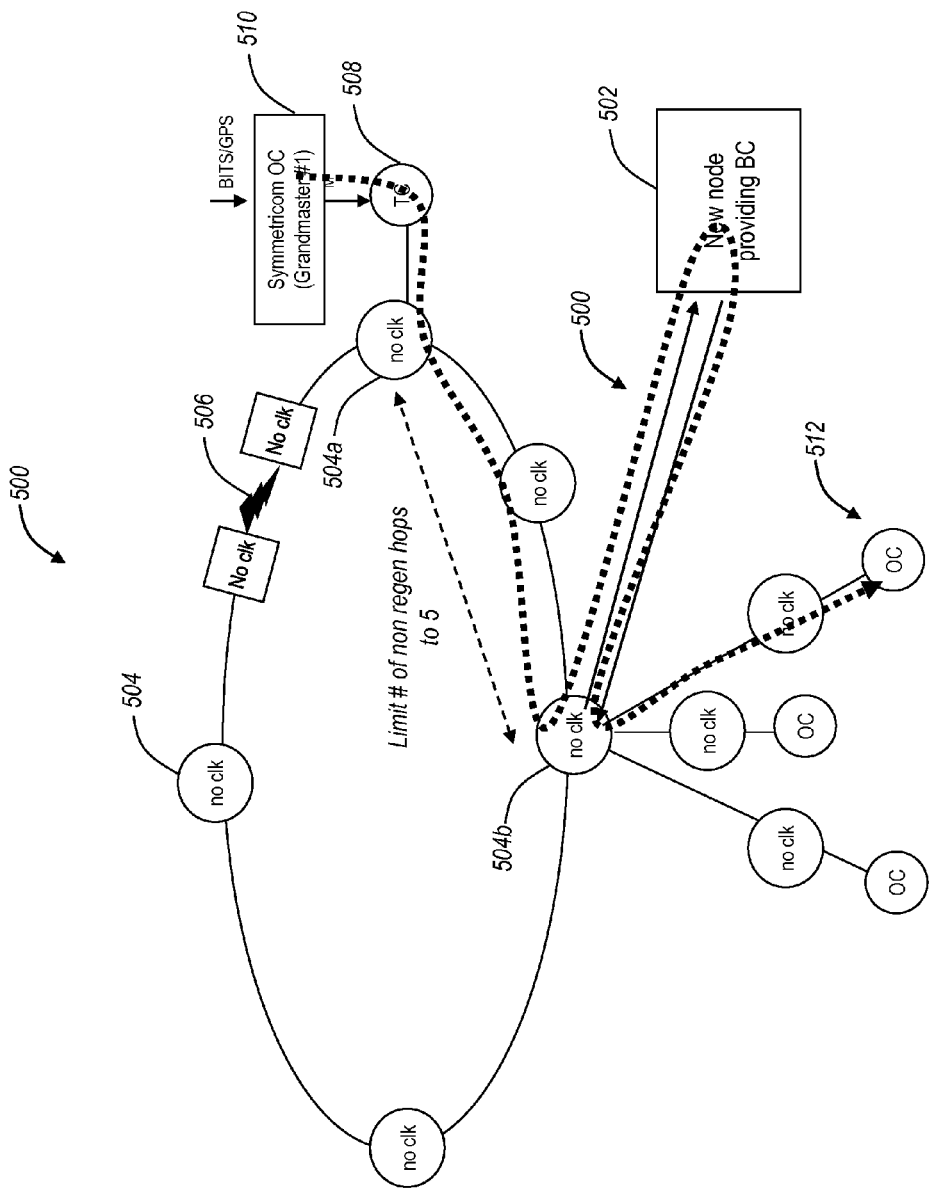
FIG. 5 is a diagram of an existing network that may be upgraded to support synchronization by adding a Boundary Clock (BC) regenerating node.

Referring to FIG. 5, in an exemplary embodiment, an existing network 500 may be upgraded to support synchronization by adding a BC regenerating node 502. The network 500 is similar to the network 404, and includes various nodes 504 without clocking and a microwave link 506. One of the nodes, e.g. a node 504a may include a branch with a TC node 508 connected to a clock node, such as an OC node 510 with a clock and a connection to a BITS/GPS reference. At another node, e.g. node 504b, the network 500 may include various nodes 512 that require a clock reference source. In the present invention, the network 500 may be upgraded by adding the BC regenerating node 502 off an Ethernet port on the node 504b (note that the Ethernet could be embedded in other wrappers such as SONET/SDH/OTN, etc). Here, the node 502 is configured to regenerate a clock from the TC node 508 for use downstream, such as at OC nodes 512. For example, the node 502 may be connected to the network 500 through an asynchronous link such as GE. This is an optimal way to upgrade an existing network: for example, add a BC regenerating node 502 every five hops, particularly at the drop point of ring structures. This number may vary depending on jitter, congestion, distance.

Figure 6:
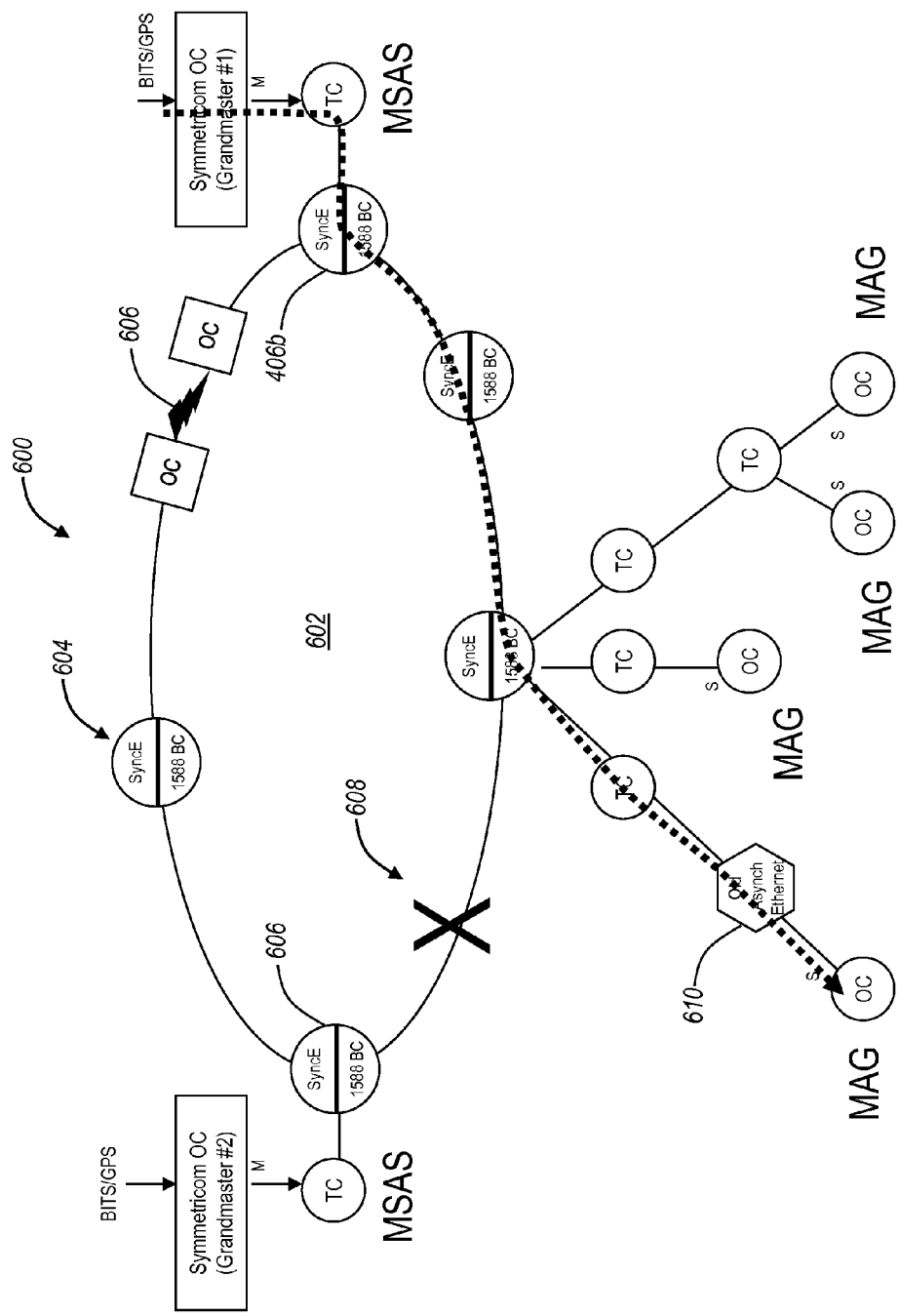
FIG. 6 is a diagram of a network limiting non-clocked hops.

Referring to FIG. 6, in an exemplary embodiment, a network 600 illustrates an embodiment limiting non-clocked hops. The network 600 includes a ring 602 with various Sync-E/PTP 1588 BC nodes 604 and a synchronous wireless hop 606. Keeping in mind that clocks degrade with every non-clocked hop or node, the network 600 is an exemplary embodiment of the present invention where every asynchronous hop is bounded by clock regeneration (BC) nodes. This is the ideal design since it minimizes the clock degeneration. The network 600 is designed such that an OC slave or BC should not have to recover timing from a path that has more than one no-timing-support hop in it. Degenerate cases of the network 600 may allow for more than one hop without regeneration, with associated performance degradation of the clock (longer time to reach stratum specifications, more wander). The reasonable maximal number of hops in this case is five, otherwise the performance may be very difficult to achieve, depending on jitter, congestion, distance, delay asymmetry. For example, the network 600 may include Endpoint ACR (allowed cell rate) with ACR over the link 606 guaranteeing SONET timing over all traffic conditions. Note, from a 1588 perspective, the radio link 606 is an open circuit (an OC is a 1588 endpoint). On a link 608, PTP breaks loops within the scope of 1588, but does not block data traffic. The network 600 may include an old asynchronous Ethernet node 610 between a TC and an OC node. The present invention includes a MAG OC PLL that smoothes out worst-case jitter from "no-timing" hop associated with the node 610.

Figure 7:
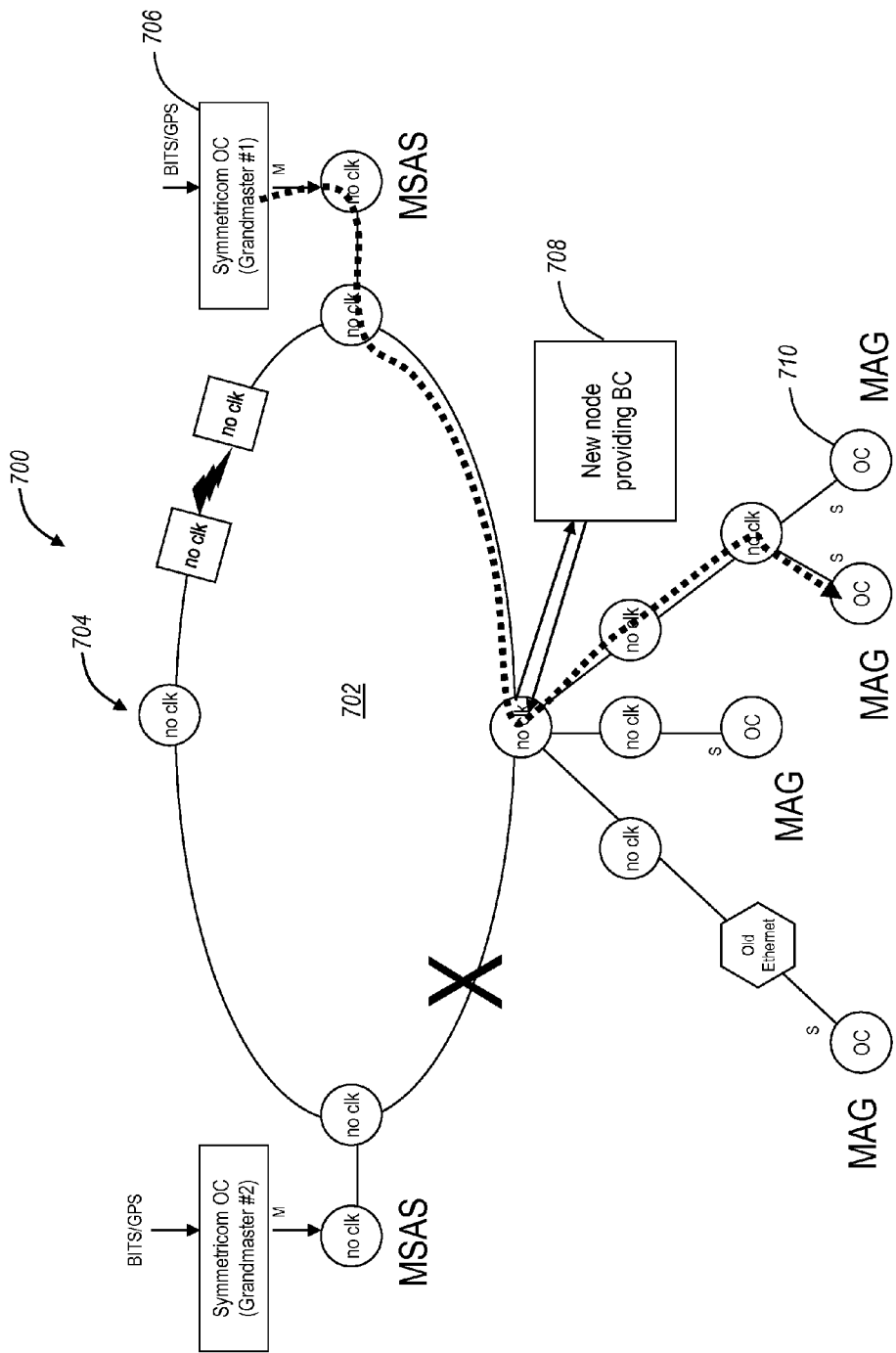
FIG. 7 is a diagram of a network as a counter example to FIG. 6 with many non-clocked hops.

Referring to FIG. 7, in an exemplary embodiment, a network 700 is a counter example to FIG. 6 with many non-clocked hops. If forced to use Endpoint ACR over multiple hops without a clock (i.e., such as the network 700), the present invention may use a very high accuracy/stability oscillator (high end OCXO or atomic clock such as Rubidium) that requires only occasional steering; like a slow-update holdover mode. Here, low-frequency wander (due to slow-varying traffic patterns) may be filtered out, and it is very tolerant to lost packets. The network 700 includes a ring 702 with various nodes 704 with no clocking, but a signal from an OC node 706 with synchronization. Here, a new node 708 providing BC is included to recover the synchronization. Note, endpoint slaves 708, 710 should include a high stability local oscillator with only occasional steering required. The embodiment here in FIG. 7 may also be used if the number of non-regenerated hops is more than five, or if the network conditioning is poor, then use a high stability local oscillator at the OC node 710 or at the BC node 708. Of note, higher quality (oven controlled or atomic) clock (typically stratum 3E or higher) in these (or similar) conditions have reasonable costs, e.g. the recent prices on stratum 2 clocks are dropping and could be used as regenerators (rubidium oscillator, ~$700 today, dropping as volumes increase).

Figure 8:
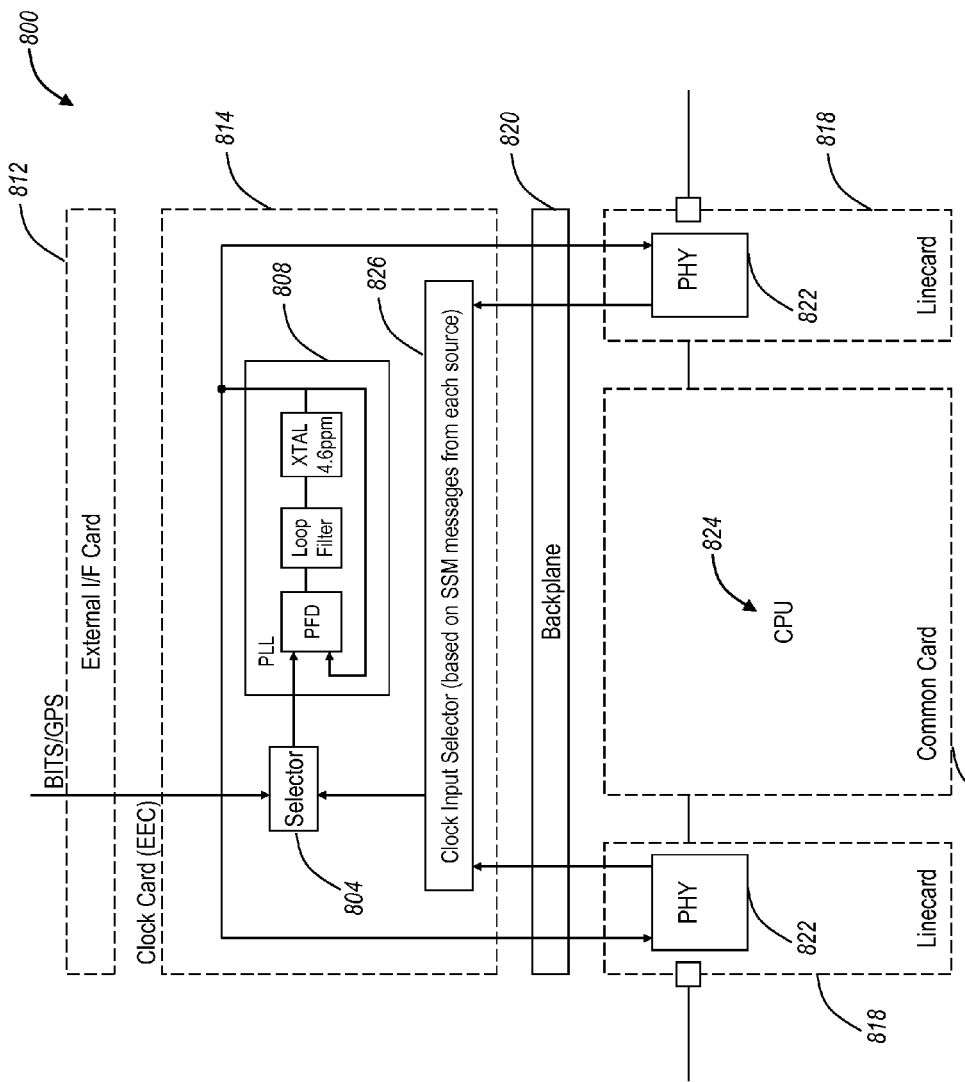
FIG. 8 is a block diagram of a Sync-E node.
Figure 9:
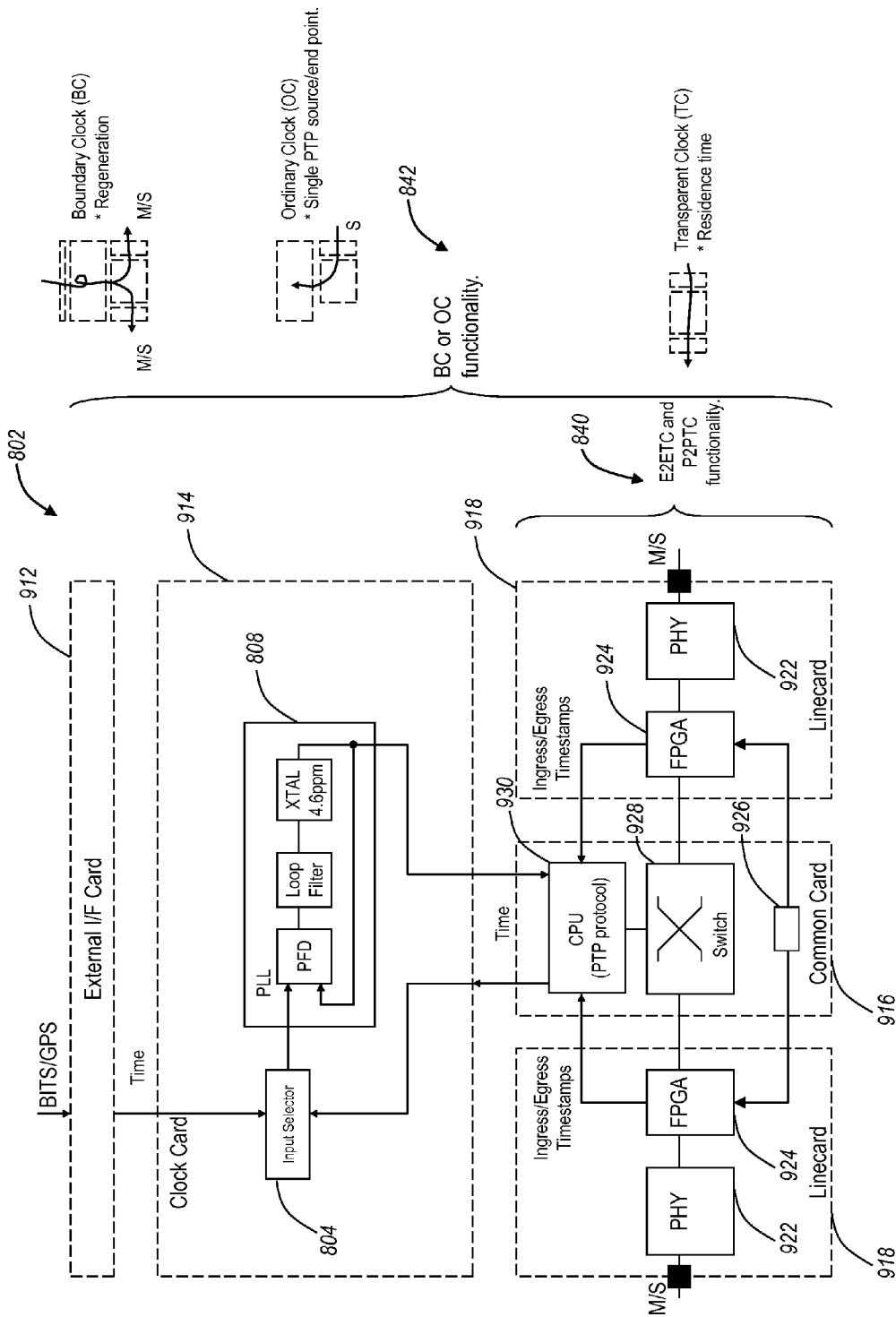
FIG. 9 is a block diagram of a PTP 1588 node.

Referring to FIGS. 8 and 9, in an exemplary embodiment, a Sync-E node 800 (FIG. 8) reference design and a PTP 1588 nodes 802 (FIG. 9) reference designs are illustrated. Note the nodes 800, 802 may be used in the networks 400, 500, 600, 700 in FIGS. 4-7. Note, that the half circle nodes is accomplished in the nodes 800, 802 by merging the two diagrams at the "selector" blocks 804, 806 that feeds a PLL 808 in each of the nodes 800, 802. So the selector 804, 806 would allow a choice of Sync-E or 1588 clocks as input to the PLL 808. The output of the PLL 808 would be able to drive a 1588 port or a Sync-E port—depending on configuration. To summarize: either Sync-E or 1588 in and either one out for a total of four possibilities, i.e. 1) Synch-E input, synch-E output; 2) 1588 input, synch-E output; 3) Synch-E input, 1588 output (frequency only); or 4) 1588 input, 1588 output. Note, in any of the four possibilities, only frequency is transferred (not phase since Sync-E does not support phase). The fifth possibility (e.g., "differential clocking") is to have both Sync-E and 1588 operating in parallel (not as a translation function described above) between two ports and using Sync-E for frequency and 1588 for phase. For Synch-e+1588 input, synch-E+1588 output, this allows decoupling traffic congestion from timing since the physical network carries synch-E as an absolute clock reference, and 1588 messages can refer to that clock when distributing phase and frequency markers.

In FIG. 8, the node 800 generally includes an external interface (I/F) card 812, a clock card (EEC) 814, a common card 816, and multiple line cards 818, all of which are connected through a backplane 820. The I/F card 812 is configured to receive an external reference such as BITS/GPS and to provide this reference to the selector 804 which is part of the clock card 814. The backplane 820 may support one clock signal per Ethernet port in the node 800 (alternatively, the selector 804 function must be hierarchically distributed). Each of the line cards 818 includes a physical (PHY) interface 822 providing ingress and egress for an Ethernet port. The PHY interface 822 provides Ethernet Synchronization Message Channel (ESMC) packets to a processor (CPU) 824 in the common card 818 at a similar layer to IEEE 802.3ah OAM. The PHY interfaces 822 must bring out the recovered clock, and each interface 822 connects to the CPU 824 and to a clock input selector 826 in the clock card 814 and receives an output from the PLL 808. The CPU 824 supports Synchronization Status Messaging (SSM)-over-ESMC for all Sync-E ports. The clock input selector 826 selects a reference based on the SSM messages from each source, and the selector 804 selects a reference between the reference selected by the clock input selector 826 and the external reference from the I/F card 812 (note, the external I/F card 812 is optional for an external clock input). The PLL 808 meets SONET jitter/wander specs and has free-run, hold-over, and acquisition modes. Specifically, the PLL 808 may include a phase/frequency detector (PFD), a loop filter, and a local oscillator having a long term free run accuracy of +/−4.6 ppm. On the wire, the node 800 provides Full-duplex only; No PAUSE frames allowed. The clock input selector 826 may include a squelch function, and the node 800 may include equipment redundancy of the clock and common cards 814, 816 (not shown).

In FIG. 9, the node 900 generally includes an external interface (I/F) card 912, a clock card (EEC) 914, a common card 916, and multiple line cards 918, all of which are interconnected. The I/F card 912 is configured to receive an external reference such as BITS/GPS and to provide this reference to the selector 804 which is part of the clock card 914. Each of the line cards 918 includes a physical (PHY) interface 922 providing ingress and egress for an Ethernet port. The PHY interface 922 may connect to a field programmable gate array (FPGA) 924 that provides Ingress/Egress timestamps based on input from a common phase clock 926. The FPGA 924 may connect to a switch 928 providing Ethernet switching functionality and a CPU 930 operating the PTP protocol and receiving packets with the timestamps. The CPU 930 may include register interfaces for clock speedup and clock slowdown commands from the clock card 914. Specifically, the CPU 930 connects to the input selector 804 providing a reference input, and the input selector 804 may select between this reference input and an optional external reference from the external reference I/F card 912. The input selector 804 provides the selected reference to the PLL 808 which in turn regenerates this reference using a PFD, loop filter, and local oscillator, and provides an output back to the CPU 930. Note, a hardware based PLL is illustrated in FIGS. 8 and 9 for its ability to handle an external reference, but a software based PLL (DPLL or digital phase locked loop) may also be used. Note, the node 802 may provide various functions, such as End-to-End Transparent Clock (E2ETC) and Peer-to-Peer Transparent Clock (P2PTC) functionality 840, or Boundary Clock (BC) or Ordinary Clock (OC) functionality 842. Note, an OC slave is equivalent to ACR endpoint. For the functionality 840, the node 802 only uses the cards 916, 918 passing through timing, i.e. Transparent Clock (TC). For the functionality 842 for an OC, the node 802 uses one side to provide a single PTP source/end point, and for a BC, the node 802 uses both side to provide clock regeneration.

Figure 10:
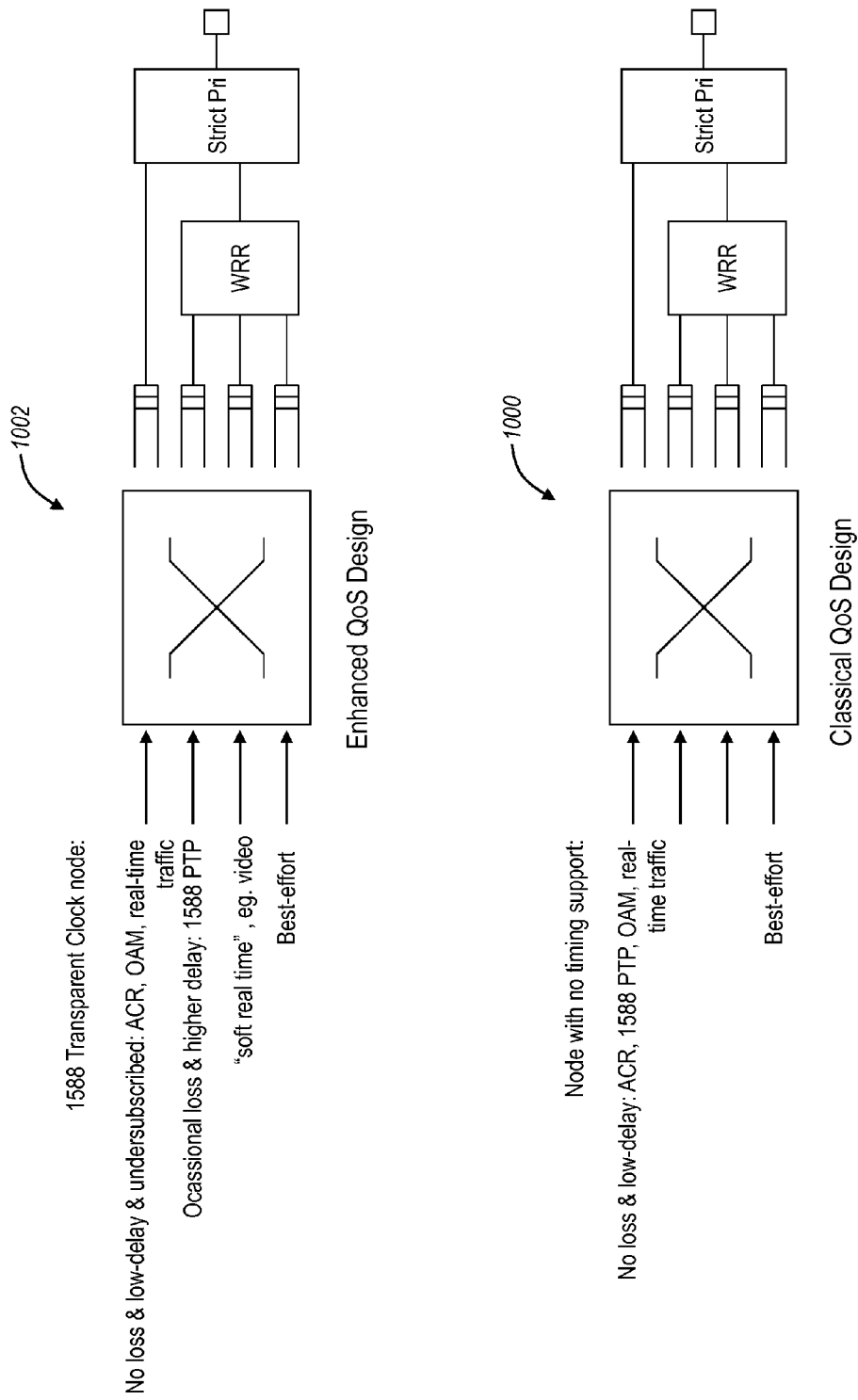
FIG. 10 is a diagram of Quality of Service (Qos) for a classical QoS design and an Enhanced QoS design.

Referring to FIG. 10, in an exemplary embodiment, Quality of Service (Qos) is illustrated for a classical QoS design 1000 and an Enhanced QoS design 1002 of the present invention. At the bottom, a typical classical node in a network is illustrated as the classical QoS design 1000, namely depicted as an Ethernet instantiation such as a router or switch. Here all "high priority" traffic is lumped together and PTP 1588 timing has no specific priority. Thus, 1588 can suffer from substantial jitter and wander due to other traffic, including lower priority traffic that may have started sending before the 1588 packet arrived. At the top, the Enhanced QoS design 1002 illustrates a switch according to the present invention with 1588 support. The classical QoS design 1000 has no timing support whereas the Enhanced QoS design 1002 is a 1588 TC node. In the Enhanced QoS design 1002, the jitter accumulated by 1588 packets is minimized by placing 1588 packets in a high priority queue. This is an optimal network/switch configuration when switches are not aware of 1588. If a switch is 1588 capable, then it will correct the 1588 timestamps. In this third case (not illustrated in FIG. 10), a 1588 TC node can operate with the 1588 packets in the lower queue. Note, there are no specific queuing requirements for 1588 packets. Thus, the 1588 packets can be queued with the rest of packets in any queue, given relatively low loss rate for the 1588 packets, and relatively low levels of timing jitter and wander. Clearly, queuing the 1588 at the highest priority is still desirable as it will ensure low loss and relatively low jitter and wander. 1588 traffic can be lower priority in a TC node in that the variable congestion delay is accounted for by the residence time measurement. In the classical QoS design 1000, 1588 traffic must be at the highest QoS since congestion delays directly add to jitter since 1588 cannot measure packet delay variation on a node that does not run the 1588 protocol.

In the present invention, a synchronous Ethernet network is preferably built QoS-wise by configuring non-1588 switches as described above in the classical QoS design 1000, 1588 TC switches as described above in the Enhanced QoS design 1002, and other 1588 switches (BC, OC, etc.) with the 1588 in any queue as timestamp messages are utilized. This will optimize 1588 performance which in turn will ensure the network timing performance requirements are met. Here, in the Enhanced QoS design 1002, highest priority (OAM) traffic and the ACR timed traffic (but not the 1588 timed traffic) is placed at the highest priority. Priority includes for the Enhanced QoS design 1002 traffic in the highest queue is that high priority packets are (made to be) short (normally limited to 100-500 bytes max length, preferably under 300); the next priority traffic is the 1588 timing so as to keep a low jitter timed stream; the next priority are larger soft-real-time packets such as video; and in the final priority, the normal "Internet" best effort traffic. Specific characteristics this priority ordering offers to 1588 are: bounded jitter, tolerance for very sensitive applications, minimizing impact of larger packets/traffic. Additionally, the present invention can adapt the shaping on the 1588 queue, in response to practical network performance. Here, 1588 jitter can be measured, by observing 1588 packet arrival and departure times (or queue depth), and if it exceeds a given amount either the priority of the 1588 timing packets (recall from above these start off in second priority) is increased and/or the reserved/guaranteed bandwidth/shaping afforded to the 1588 queue is increased (thereby adding latency but reducing jitter since jitter and latency are exchangeable). Also, the present invention can reserve guaranteed (empty) time slots for the 1588 packets to egress (similar to a TDM system), and boost the priority of 1588 packets from Weighted round robin (WRR) with the other lower priority traffic, into a second strict priority queue. Controlling jitter and latency is important since timing at the end points is derived from 1588 packets. Note, this method of increasing 1588 priority applies only to non-TC nodes only as increasing priority on TC nodes would just waste resources because residence time measurements will nullify the jitter (to some extent—if jitter is heavy there would be benefits). Here, this combination describes a case where TC and non-TC nodes are chained to form the network, and the QoS would be adjusted only on the non-TC nodes rather than on all nodes. It is also noted that operating switches at "layer 2" (switching, possibly carrier ethernet (CE)) will offer better jitter and control of packet timing than networks based on layer 3 (routing) due to switch characteristics such as cost, throughput, queuing, jitter, latency, consistency of timing.

Figure 11:
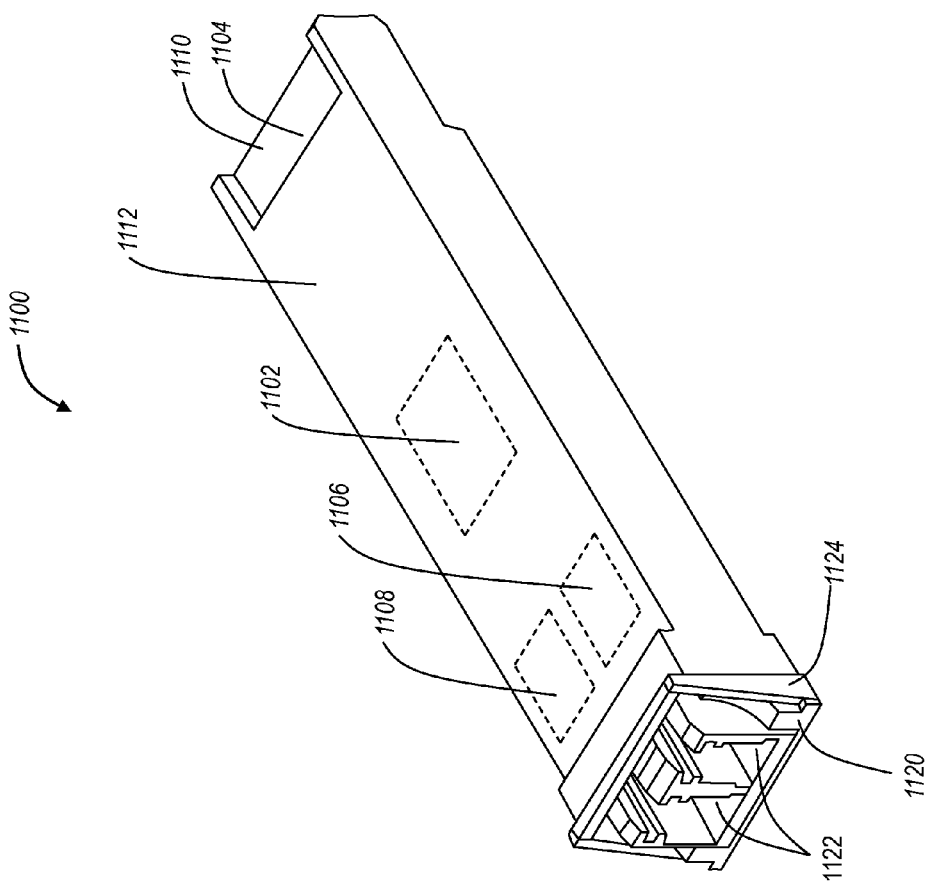
FIG. 11 is a perspective view of a pluggable optical transceiver.

Referring to FIG. 11, in an exemplary embodiment, a perspective view illustrates a pluggable optical transceiver 1100, such as a Small Form Factor Pluggable (SFP) or the like. The optical transceiver 1100 includes integrated circuitry 1102 mounted therein to a printed circuit board 1104. The integrated circuitry 1102 may be one or more application specific integrated circuits (ASICs) to support both the electronics of the transmit and receive (Tx/Rx). The optical transceiver 1100 further includes a light transmitter 1106 (i.e., an EO converter) and a light receiver 1108 (i.e., an OE converter).

The optical transceiver 1100 can be compatible with XFP, 300-pin, XPAK, X2, XENPAK MSAs, and other proprietary or standard packages. The printed circuit board 1104 includes top and bottom pads (top pads illustrated) to form an edge connection 1110 to couple to a socket of a host device (not shown). A housing 1112 couples around the printed circuit board 1104 to protect and shield the integrated circuitry 1102 and other components in the transceiver 1100. Note, the housing 1112 is typically defined in the Multi Source Agreement (MSA). A front fiber optic plug receptacle 1120 is provided with openings 1122 to interface with one or more fiber optic cables and their plugs. A mechanical latch/release mechanism 1124 can be provided as part of the optical transceiver 1100. While the optical transceiver 1100 has been described has having both light transmission and light reception capability, it may be a fiber optic transmitter module with light transmission only or a fiber optic receiver module with light reception only.

The present invention may include 1588 TC timestamping in the transceiver 1100, e.g., an SFP, as an inexpensive way of upgrading existing equipment on a port-by-port basis. Herein, the present invention may include a method of using an Inter-Integrated Circuit (I2C) interface (I/F) to phase synchronize SFPs. SFPs are field replaceable optical units typically containing some monitoring and drivers and management (the latter over an I2C bus) and power. The present invention can incorporate the TC of FIG. 2d into the SFP (or into an SFP carrier that itself is SFP compliant), in order to easily add 1588 compliance to an existing (legacy) network, i.e., adding protocol interpreting logic to an optical SFP, and thus can now timestamp ingress and egress messages (normally 1588 messages) in order to mark switch residence time and eliminate switch (or other node) jitter (usually due to traffic conditions). This may also include a BC clock embedded. These are likely powered by the SFP's power feed but could in fact be physically elsewhere and/or powered remotely or separately, i.e. there is no physical constraint other than (a) it maintains the features of the original SFP (b) it plugs into an existing switch—allowing upgrade of an existing switch/network/path to 1588 compliance. This capability allows upgrading existing GE or other network elements to 1588 compliance. SFP's are just one example of a module with timestamping functionality built in. Others are XFP, XENPAK, GBIC, etc. The modules can be optical, electrical, single/multi lane, etc. This can include any standardized customer-pluggable module and re-purposing its OAM I/F for synchronizing phase of multiple modules. The key element is that any module can timestamp packets, but the present invention can also phase-synchronize multiple modules. One way of phase synchronizing multiple SFPs is to send them all a special phase-sync message at the same time (over their OAM I/F). In OAM I/F's that support broadcast, this should be used to minimize the delay variation in time-of-arrival of the message to the modules. If the phase-sync message must be unicast to each module, there may be benefit in establishing an offset for each module that factors in the delay between messages to specific modules.

In an exemplary embodiment, a method may include using an I2C I/F to phase synchronize SFPs. Note, the I2C is a serial interface that is used to manage an SFP module. The present invention phase synchronizes multiple SFPs on multiple ports of an upgraded switch to the same time base, to avoid time stamp errors. For example, all the SFPs can be synchronized to a central free-running local oscillator. This can apply to 1588 transparent clocks and to Sync-E. In the case of 1588, the SFP communicates time to its external interface via the 1588 protocol and to its internal I/F via the methods described here. In the case of Sync-E, the SFP communicates frequency to its external I/F using Sync-E standards and on its internal I/F using the methods described here. The SFP essentially acts as a bridge between the internal time I/F and the external time I/F. "Smart SFP" can have the capability to perform status management and memory operations. This can be done by intercepting packets on the high speed serial ports. This capability can be used to synchronize multiple SFP between each other either as an external master to each SFP or between themselves, using the messaging and storage capabilities. Variations of this may also be accomplished. This adds the important capability to synchronize multiple SFPs using smart SFP capabilities. This method can also be used to transfer 1588 information to the SFP for synching. Once synchronized time stamping and/or phase and frequency alignment can be performed. Additionally, performance monitoring using the smart SFP communication capabilities can be done, and achieve time synchronized statistics. For example if the ingress and egress SFP are phase synchronized, then you can get stats at a single point in time which lets you correlate them to figure out issues in the box. This also applies to other variants past and future of the SFP standard, such as XFP, and to whatever bus is used to connect to it (i.e. instead of normally used I2C). Phase-synchronization of multiple SFPs in one box can also be achieved via packet communication (i.e. a packet sent towards the SFP's internal I/F and terminated by the SFP—example Ethernet Auto-Negotiation packets). These can be high-priority multicast or broadcast packets whose phase delay variation are tightly controlled via QoS methods inside the box. The time of packet reception by the SFP can be used to reset the phase or some offset from the time of reception. Given that all SFPs are easily frequency synchronized, phase synchronization does not need to occur very often—once per second or only during special events such as software re-boot, new SFP plugged in, etc. Alternatively to I2C or packet methods, 8B10B, 64B65B, or other line codes can be used to communicate phase information that is terminated by the SFP. The above network architectures and implementations apply equally well to other network protocols including NTP (e.g. NTP v4), and variations or evolutions of the protocols listed, as well as any new or unlisted time protocol. The main point is the synchronous/asynch nature of the network and how to implement a correctly functioning network, as described above.

Figure 12:
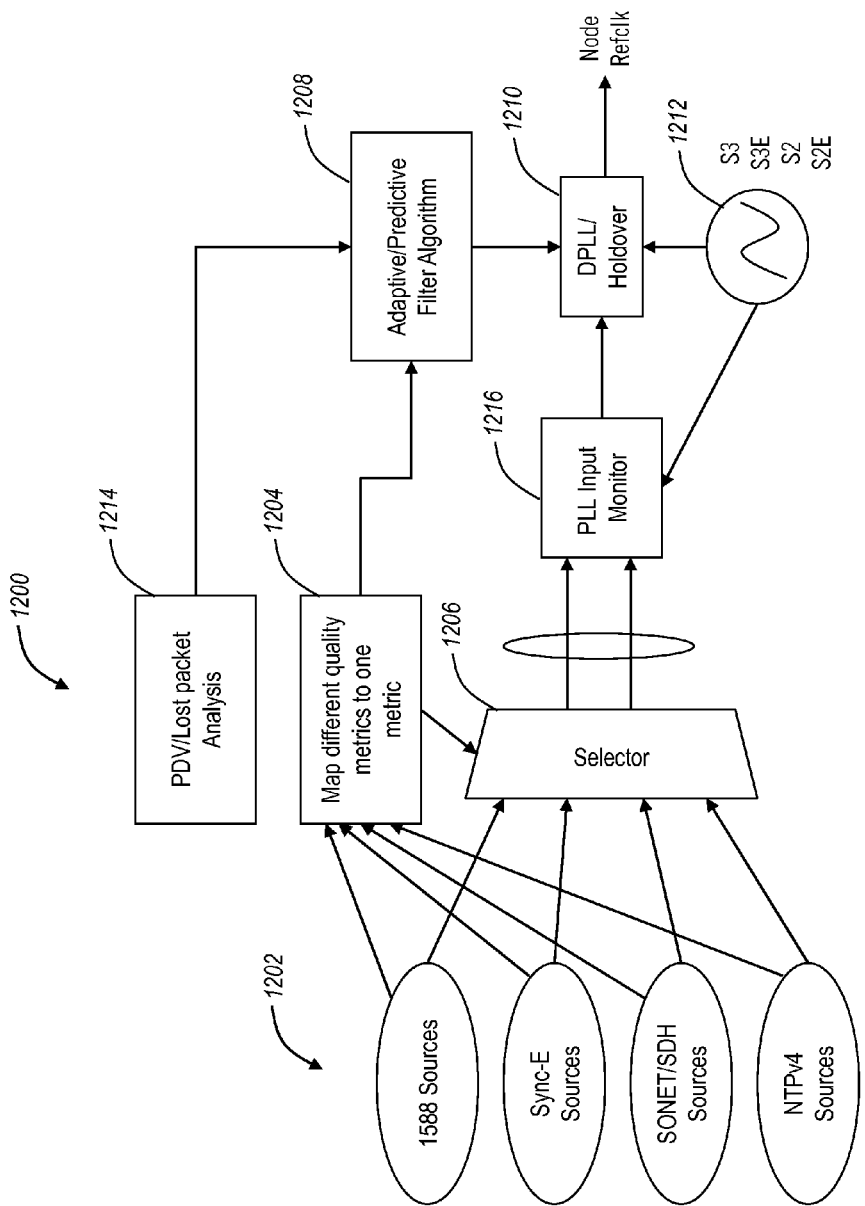
FIG. 12 is a diagram of a best multi-source clock selection algorithm.

Referring to FIG. 12, in an exemplary embodiment, a best multi-source clock selection algorithm 1200 is illustrated. Sync-E and 1588 algorithms are defined in the standards with no knowledge of each other's state. They each have methods for choosing the "best clock" within their domains. The present invention includes a method for choosing between the best Sync-E clock and the best 1588 clock, and if other clock sources (e.g. SONET, NTPv4) are available, they would be factored into the clock selection decision, i.e. the best multi-source clock selection algorithm 1200. The clock selection algorithm 1200 includes various synchronization sources 1202 (including redundant sources) from the varied network interfaces indicated, and not all may be available. Each has its own quality characteristics and mechanism for reporting such to the receiving node. The quality metrics from each type of interface are mapped to a common criteria (step 1204) so that a fair and common quality metric can be assigned to each. The node is required to choose the best quality, highest reliability clock source to maintain synchronization stability (through a selector 1206). The quality metrics can be sent out of band over the channel via SSM (synchronization status messaging (indicates source quality, stratum level, current state, etc.) or by short and long term monitoring of the particular behavior of a sync source for performance issues. An adaptive/predictive filter algorithm 1208 attempts to 'understand' the nature of impairments of a given sync source in order to tailor PLL bandwidth and holdover characteristics 1210 to that particular sync source type. This is more important for the packet based sync sources that are more prone to impairments caused by traffic congestion, lost packets, delayed packets, etc. A history of performance could be obtained in order to temporarily or permanently disqualify or preemptively disqualify a source before the local clock is corrupted.

A local oscillator 1212 can be of varying quality (stability) (a cost tradeoff). The Sx's represent some possible clocks here as Stratum levels with S2E being the highest shown. The higher quality local oscillators 1212 have higher accuracy and stability that allows for higher levels of filtering of the incoming clocks and also allow for longer periods of holdover operation (input sync lost operation). The filtering algorithms would be modified to take advantage of the stability of the local oscillator 1212. A PDV/Lost packet analyzer 1214 is another method of determining the behavioral quality of a packet based sync source. This would be used to determine if a particular link is subject to packet network impairments that make it unsuitable as a sync source or if tailored filtering is required to allow its use when no other sources are available. A PLL input monitor 1216 can receive two clock sources from the selector 1216, and can provide autonomous input monitoring that can force the PLL into holdover independent from SSM messages. A further refinement on the clock selection algorithm 1200 can be to select one clock for Syntonization and a different clock for Synchronization. Another further refinement involves selection of a backup clock that is of a different type than the primary clock. Clock selection and management algorithms can be adaptive in response to various networks or network impairments.

In another exemplary embodiment, the clock selection algorithm 1200 may be modified by linking it to Provider Backbone Transport (PBT) protection switching; automatically link timing path to provisioned PBT path. The timing source that is linked can be 1588 messaging for 1588 clock trees, or SSM-over-CFM messaging for Sync-E timing trees. The 1588 Best Master algorithm allows 1588 clocks to select a clock source from multiple timing masters (e.g., nodes 416, 418 in FIG. 4). The clock selection algorithm 1200 may based on (in order): Priority1 {clockClass, clockAccuracy, offsetScaledLogVariance}, Priority2: {clockIdentity (for tie-breaking)} and this priority information is obtained/distributed either with special G.826x series messages, or with 1588 Synch Messages (synch messages are used to build the timing tree—what timing source to use). 1588 uses a bunch of different message types: Synch, Announce, Delay_Req, etc. All 1588 messages have this common header: transportSpecific: used when mapping to different transport layers (e.g. Ethernet); messageType (e.g. synch, Delay_Req, etc.); versionPTP; messageLength; domainNumber; flagField (alternateMasterFlag, twoStepFlag, unicastFlag, PTP profile specific 1, PTP profile specific 2, leap61, leap59, currentUtcOffsetValid, ptpTimescale, timeTraceable, frequencyTraceable); correctionField (meaning depends on message type, but it's basically the residence time in transparent clocks); sourcePortIdentity; sequenceId; controlField (not used—just provides PTP version 1 compatibility); logMessageInterval (logarithm of the message interval—depends on message type); SSM=Synchronous Status Messages for Sync-E.

The present invention provides integration of synchronizing the source (both for Sync-E and/or for 1588, independently) to the underlying carrier Ethernet (CE) (tunnel) mechanisms, protocols, and (managed or unmanaged recovery) switchovers CE can be one of PBB-TE, MPLS, MPLS-TP, VPLS, H-VPLS, etc. The timing tree (SSM controlled equivalence) can be implicitly carried by tying the clocking source to a specific PBB-TE tunnel, since to operate a tunnel needs an end to end path thus validating a path thus a source for the clock master. Using two PBB-TE tunnels (identified for example by SID (service identifier)) offers a primary and secondary path both for data, and for clocking source. One integration method includes using the CFM (802.1ag/Y.1731) messages by extending them to include a new type/field which is the SSM. This reduces the number of messages, quantity of management traffic, and couples two items together that belong together, since the protection tunnels will normally be impacted when clocking trees must be changed. Finally, managed CE tunnel switchovers are to be coupled with the clock management system in order to minimize clocking hits by doing a managed clock source (reference) switchover. 1588 also operates in an inter controller mode. Here, nodal controllers communicate with each other to adjust the clocks, using the 1588 protocol set. This can simplify specific network protocol dependence for example the clocking subsystem may not need to be as aware of MPLS or PBB-TE or MPLS-TP encapsulations.

This method can be applied to alternative carrier Ethernet architectures, specifically including MPLS, MPLS-TP, VPLS, H-VPLS, etc. (ie. Instead of PBB-TE), using their (equivalent) integrated messaging structures. (and the SSM messages can be tagged to a variety of relevant messages in these other protocols including CCM, BFD, etc). Tying the clock selection to the CE tunnel does not necessarily mean that the timing packets are carried inside the tunnel or even integrated into the tunnel's own OAM messages. The state of a tunnel (e.g. active/standby state) can be used to select between two clock sources and the timing packets can be carried outside of the tunnel. Some tunneling technologies (e.g. MPLS-TP) might be better than others (e.g. PBB-TE) since specific messages can be more easily stripped off by intermediate points (e.g. TC's) even though the tunnel is end-to-end.

Figure 13:
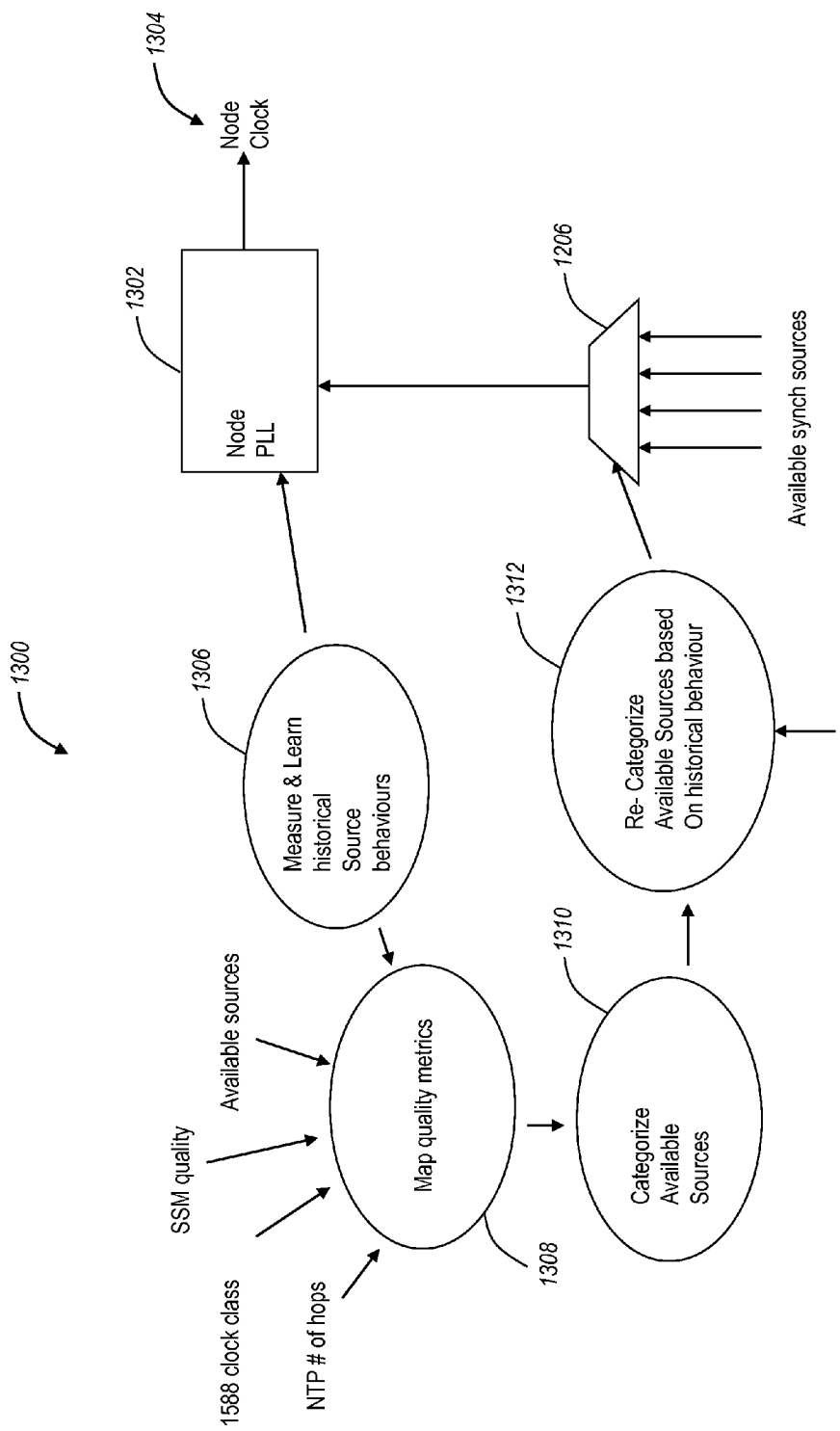
FIG. 13 is a diagram of a clock selection holdover algorithm.

Referring to FIG. 13, in an exemplary embodiment, a clock selection holdover algorithm 1300 is illustrated. The algorithm 1300 is illustrated as a state machine that shows how the clock selection interacts with hold-over and reversion modes. The algorithm 1300 interacts with the selector 1206 and a node PLL 1302 to provide a node clock 1304. This is accomplished by measuring and learning historical source behaviors 1306, mapping quality metrics 1308, categorizing available sources 1310, and re-categorizing available sources based on historical behavior 1312 to select one of the available sources or holdover. For example, the algorithm 1300 may Use the local clock when in known good synchronization and check for quality issues with SSM categorized clocks. The criteria for entry into holdover or reversion from holdover can be modified by stability of the local clock (greater stability means holdover can be more of a crutch) or historical behavior of the source clocks in order to avoid transient issues.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:
1. An Ethernet network, comprising:
one or more non-clocked nodes without synchronous Ethernet (Sync-E) or IEEE 1588 capability;
an end node with a clock providing an Ethernet connection comprising a reference clock through at least one of the one or more non-clocked nodes;
a clock regeneration node disposed after the at least one of the one or more non-clocked nodes receiving the Ethernet connection and regenerating the reference clock, wherein the clock regeneration node is located at a drop off point of the Ethernet connection; and
one or more Sync-E nodes receiving the Ethernet connection after the clock regeneration node, wherein the end node operates according to the IEEE 1588 protocols, and wherein the one or more Sync-E nodes operate according to the Sync-E protocols thereby reducing a number of slaves for IEEE 1588.

2. The Ethernet network of claim 1, wherein the clock regeneration node is configured to operate according to both synchronous Ethernet (Sync-E) and IEEE 1588 protocols.

3. The Ethernet network of claim 1, wherein the clock regeneration node is configured to regenerate Sync-E for downstream nodes without requiring Sync-E upstream, and wherein the reference clock is according to the IEEE 1588 protocols and operable to traverse asynchronous nodes while being rebuilt at the clock regeneration node.

4. The Ethernet network of claim 1, wherein the Ethernet connection traverses no more than five consecutive non-clocked nodes prior to the clock regeneration node.

5. The Ethernet network of claim 1, wherein the Ethernet connection traverses no more than one consecutive non-clocked node prior to the clock regeneration node.

6. The Ethernet network of claim 1, wherein the Ethernet connection traverses more than one consecutive non-clocked node prior to the clock regeneration node, and the Ethernet network further comprises:
a high stability local oscillator at the clock regeneration node.

7. The Ethernet network of claim 1, wherein at each of the one or more non-clocked nodes is configured to provide packets from the Ethernet connection with the clock reference in a high priority queue.

8. The Ethernet network of claim 1, wherein the end node comprises:
physical interfaces and circuitry configured to timestamp ingress and egress packets relative to a phase clock;
a processor operating according to the IEEE 1588 protocols, the processor receiving timestamps and providing one or more reference clocks to an input selector; and
a phase lock loop receiving an output of the input selector and providing an output reference clock to the processor.

9. The Ethernet network of claim 8, further comprising a best multi source clock selection algorithm and a clock selection holdover algorithm for the end node.

10. The Ethernet network of claim 1, wherein the one or more Sync-E nodes each comprise:
physical interfaces providing a reference clock to a clock input selector;
circuitry receiving synchronization status messages from the physical interfaces and providing the synchronization status messages to the clock input selector; and
a phase lock loop receiving an input from the clock input selector and providing an output to the physical interfaces.

11. The Ethernet network of claim 10, further comprising a best multi source clock selection algorithm and a clock selection holdover algorithm for the end clock node.

12. A method, comprising:

transmitting an Ethernet connection with a reference clock in a network;

adapting quality of service in at least one Transparent Clock node in the network for the Ethernet connection;

regenerating the reference clock at a clock regeneration node located at a drop off point of the Ethernet connection after the Ethernet connection traverses at least one non-clocked node in the network without synchronous Ethernet (Sync-E) or IEEE 1588 capability; and receiving the Ethernet connection at at least one clocked node after the clock regeneration node;

wherein the clock regeneration node is configured to regenerate Sync-E for downstream nodes without requiring Sync-E upstream, and wherein the reference clock is according to the IEEE 1588 protocols and operable to traverse asynchronous nodes while being rebuilt at the clock regeneration node.

13. The method of claim 12, further comprising:

receiving a plurality of reference sources at a node in the network, the reference sources comprising one or more of IEEE 1588 sources, Synchronous Ethernet (Sync-E) sources, SONET/SDH sources, Network Time Protocol sources, and external reference sources;

determining quality metrics of the plurality of reference sources;

selecting one of the plurality of reference sources based on the quality metrics;

performing an adaptive/predictive filter algorithm; and inputting the selected source to a phase lock loop.

14. The method of claim 13, further comprising:

selecting the one of the plurality of reference sources based on a tunnel technology comprising at least PBB-TE or MPLS-TP.

15. An Ethernet network, comprising:

one or more non-clocked nodes without synchronous Ethernet (Sync-E) or IEEE 1588 capability;

an end node with a clock providing an Ethernet connection comprising a reference clock through at least one of the one or more non-clocked nodes;

a clock regeneration node disposed after the at least one of the one or more non-clocked nodes receiving the Ethernet connection and regenerating the reference clock, wherein the clock regeneration node is located at a drop off point of the Ethernet connection; and one or more clocked nodes receiving the Ethernet connection after the clock regeneration node;

wherein the clock regeneration node is configured to regenerate Sync-E for downstream nodes without requiring Sync-E upstream, and wherein the reference clock is according to the IEEE 1588 protocols and operable to traverse asynchronous nodes while being rebuilt at the clock regeneration node.

16. The Ethernet network of claim 15, wherein the clock regeneration node is configured to operate according to both synchronous Ethernet (Sync-E) and IEEE 1588 protocols.

17. The Ethernet network of claim 15, further comprising:

one or more Sync-E nodes receiving the Ethernet connection after the clock regeneration node, wherein the end node operates according to the IEEE 1588 protocols, and wherein the one or more Sync-E nodes operate according to the Sync-E protocols thereby reducing a number of slaves for IEEE 1588.

18. The Ethernet network of claim 15, wherein the end node comprises:

physical interfaces and circuitry configured to timestamp ingress and egress packets relative to a phase clock;

a processor operating according to the IEEE 1588 protocols, the processor receiving timestamps and providing one or more reference clocks to an input selector; and a phase lock loop receiving an output of the input selector and providing an output reference clock to the processor.

19. The Ethernet network of claim 17, wherein the one or more Sync-E nodes each comprise:

physical interfaces providing a reference clock to a clock input selector;

circuitry receiving synchronization status messages from the physical interfaces and providing the synchronization status messages to the clock input selector; and a phase lock loop receiving an input from the clock input selector and providing an output to the physical interfaces.

* * * * *